(12) United States Patent
Said (10) Patent No.: US 7,191,103 B2
(45) Date of Patent: Mar. 13, 2007

(54) PREDOMINANT COLOR IDENTIFICATION IN DIGITAL IMAGES

(75) Inventor: Amir Said, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 900 days.

(21) Appl. No.: 09/924,926

(22) Filed: Aug. 8, 2001

(65) Prior Publication Data

US 2003/0031361 A1    Feb. 13, 2003

(51) Int. Cl.
*G06F 17/10*    (2006.01)
(52) U.S. Cl. .............................. 703/2; 703/13; 703/14; 382/164; 382/166; 382/167
(58) Field of Classification Search .................... 703/2, 703/13; 382/162, 166, 167, 164
See application file for complete search history.

(56) References Cited

U.S. PATENT DOCUMENTS

| | | | | |
|---|---|---|---|---|
| 5,079,630 A * | 1/1992 | Golin et al. | ............ | 375/240.08 |
| 5,396,564 A * | 3/1995 | Fitzpatrick et al. | ......... | 382/182 |
| 5,585,944 A * | 12/1996 | Rodriguez | ................. | 358/500 |
| 5,802,361 A * | 9/1998 | Wang et al. | ................ | 382/217 |
| 5,835,625 A * | 11/1998 | Fitzpatrick et al. | ......... | 382/165 |
| 5,859,926 A * | 1/1999 | Asahi et al. | ................ | 382/166 |
| 5,891,394 A * | 4/1999 | Drocourt et al. | .............. | 422/50 |
| 5,933,253 A * | 8/1999 | Ito et al. | ....................... | 358/500 |
| 6,011,595 A * | 1/2000 | Henderson et al. | ......... | 348/590 |
| 6,049,627 A * | 4/2000 | Becker et al. | .............. | 382/181 |
| 6,094,453 A * | 7/2000 | Gosselin et al. | ....... | 375/240.24 |
| 6,128,407 A * | 10/2000 | Inoue et al. | ................ | 382/167 |
| 6,304,340 B1 * | 10/2001 | Wang | .......................... | 358/1.9 |
| 6,373,890 B1 * | 4/2002 | Freeman | ..................... | 382/239 |
| 6,430,312 B1 * | 8/2002 | Huang et al. | ............... | 382/165 |
| 6,434,273 B1 * | 8/2002 | Gillman et al. | ............. | 382/239 |
| 6,449,384 B2 * | 9/2002 | Laumeyer et al. | .......... | 382/104 |
| 6,453,274 B2 * | 9/2002 | Kamon | .......................... | 703/2 |
| 6,480,627 B1 * | 11/2002 | Mathias et al. | ............. | 382/224 |
| 6,505,002 B2 * | 1/2003 | Fields | ......................... | 396/287 |
| 6,546,130 B1 * | 4/2003 | Inoue et al. | ................ | 382/162 |
| 6,574,364 B1 * | 6/2003 | Economidis et al. | ....... | 382/166 |
| 6,584,154 B1 * | 6/2003 | Wu | ....................... | 375/240.16 |
| 6,587,583 B1 * | 7/2003 | Kurzweil et al. | ........... | 382/164 |
| 6,621,926 B1 * | 9/2003 | Yoon et al. | ................. | 382/168 |
| 6,650,772 B1 * | 11/2003 | Inoue et al. | ................ | 382/162 |
| 6,690,834 B1 * | 2/2004 | Le Cornec | .................. | 382/236 |
| 6,701,012 B1 * | 3/2004 | Matthews | .................... | 382/173 |
| 6,701,020 B2 * | 3/2004 | Chrysafis et al. | ........... | 382/239 |
| 6,744,919 B2 * | 6/2004 | Said | .......................... | 382/166 |
| 6,774,917 B1 * | 8/2004 | Foote et al. | ................ | 715/700 |

(Continued)

FOREIGN PATENT DOCUMENTS

JP    09289586    11/1997

OTHER PUBLICATIONS

"A Genetic Approach to Color Image Compression", H. Feiel, ACM 0-89791-850-9, ACM 1997.*

(Continued)

*Primary Examiner*—Fred Ferris (57) ABSTRACT

At least one predominant color in a digital image is identified by applying a detection rule to randomly-selected pixels in the image. The detection rule includes testing specific colors to reduce the probability of at least one of a false-positive outcome and a false-negative outcome.

23 Claims, 4 Drawing Sheets

U.S. PATENT DOCUMENTS

| | | | |
|---|---|---|---|
| 6,789,052 B1* | 9/2004 | Toprac | 703/2 |
| 6,829,063 B1* | 12/2004 | Allebach et al. | 358/3.13 |
| 6,832,006 B2* | 12/2004 | Savakis et al. | 382/239 |
| 2001/0000670 A1* | 5/2001 | Moskalev | 347/43 |
| 2001/0046318 A1* | 11/2001 | Lee et al. | 382/166 |
| 2001/0053248 A1 | 12/2001 | Mitsuru | |
| 2002/0063719 A1* | 5/2002 | Ziobro | 345/582 |
| 2002/0071104 A1* | 6/2002 | Silverbrook | 355/18 |
| 2003/0016877 A1* | 1/2003 | Baharav et al. | 382/248 |

OTHER PUBLICATIONS

"3D RGB Image Compression for Interactive Applications", C. Bajaj et al, ACM Transactions on Graphics, vol. 20, No. 1, Jan. 2001.*

"An Image Multiresolution Representation for Lossless and Lossy Compression", A. Said et al, IEEE Transactions on Image Processing, vol. 5, No. 9, Sep. 1996.*

"Image Compression Using the Spatial-Orientation Tree", A. Said et al, IEEE 0-7803-1254-6/93, IEEE 1993.*

"MPEG-4: an object-based multimedia coding standard supporting mobile applications", A. Puri et al, Mobile Networks and Applications 3, 1998.*

"Second-Generation Image Coding: an Overview", M.M. Reid et al, ACM Computing Surveys, vol. 29, No. 1, Mar. 1997.*

"Statistical Pattern Recognition", A. Webb, Chapter 1, pp. 1-31, Oxford University Press, 1999 teaches statistical analysis in pattern recognition.*

"Robust Mesh Watermarking", Praun et al, ACM 1999.*

"Statistical cues for Domain Specific Image Segmentation with Performance Analysis", Konishi et al, IEEE 1063-6919/00, 2000 IEEE.*

Pratt, W.K.: Digital Image Processing, 1978, Wiley & Son, USA XP002257231, pp. 539-541, on-line.

* cited by examiner

PREDOMINANT COLOR IDENTIFICATION IN DIGITAL IMAGES

BACKGROUND

The present invention relates to digital images. More specifically, the present invention relates to compression of compound documents.

A hardcopy device such as a digital copier typically includes a scan engine for converting pages of documents into digital images, memory for storing the digital images, and a print engine for printing out the stored images. The memory is usually large enough to store at least one full digital image. By storing a full digital image in memory, the digital copier can print out multiple copies of the stored image.

Digital image compression is performed to reduce the memory and bandwidth requirements of the digital copier. Reducing the memory and bandwidth requirements, in turn, reduces the cost of the digital copier.

A single compression algorithm is usually not suitable for compressing compound documents. Compound documents may contain text, drawings and photo regions (sometimes overlaid), complex backgrounds (e.g., text boxes), watermarks and gradients. For example, magazines, journals and textbooks usually contain two or more of these features. Compression algorithms such as JPEG are suitable for compressing photo regions of the compound color documents, but they are not suitable for compressing black and white text regions of the compound color documents. These lossy compression algorithms are based on linear transforms (e.g., discrete cosine transform, discrete wavelet transform) and do not compress edges efficiently. They require too many bits, and may produce very objectionable artifacts around text.

Compression algorithms such as CCITT, G4 and JBIG are suitable for compressing black and white text regions of the compound color documents. However, they are not suitable for compressing photo regions of the compound color documents.

A typical solution is to pre-process the documents, separating the regions according to the type of information they contain. For instance, regions containing edges (e.g., regions containing text, line-art, graphics) and regions containing natural features (e.g., regions containing photos, color backgrounds and gradients) are separated and compressed according to different algorithms.

Knowledge of a predominant color in a digital image can lead to more efficient compression of the digital image.

SUMMARY

According to one aspect of the present invention, at least one predominant color in a digital image is identified by applying a detection rule to randomly-selected pixels in the image. Other aspects and advantages of the present invention will become apparent from the following detailed description, taken in conjunction with the accompanying drawings, illustrating by way of example the principles of the present invention.

DETAILED DESCRIPTION

Figure 1:
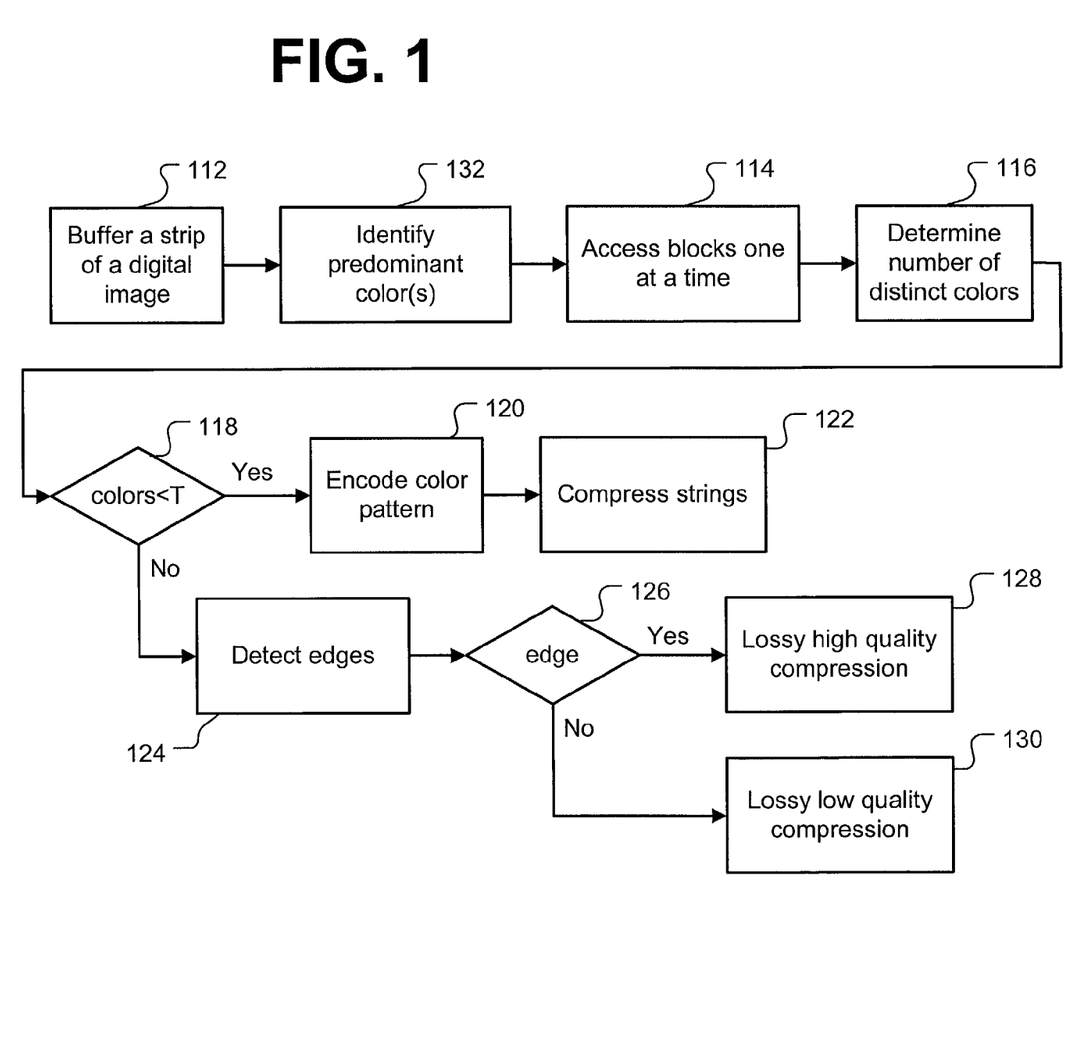
FIG. 1 is an illustration of a method for processing a digital image.

Reference is made to FIG. 1, which illustrates a method for processing a digital image. The digital image is made up of a plurality of pixels, each pixel represented by an n-bit word. In a typical 24-bit word representing RGB color space, for instance, eight bits represent a red component, eight bits represent a green component and eight bits represent a blue component.

The digital image is processed one strip at a time. Each strip contains a row of contiguous blocks. Each block contains a relatively small number of pixels relative to the number of pixels in the digital image. A typical block size may be 16×16 pixels or 32×32 pixels. The smaller blocks require less memory and result in better resolution. In practice, block size will be dictated by memory constraints on the hardcopy device.

Processing of a single strip will now be described. The strip is buffered (112) and blocks are accessed one at a time (114). For each block, the number of distinct colors is determined (116), and compared to a threshold number (118). A block having less than the threshold number of colors is likely to contain text or other computer-generated features. A block having as many as, or more than, the threshold number of colors is likely to contain a color gradient.

If a block has less than the threshold number of colors, its color pattern is encoded (120). Consider an example in which the threshold number is three and a block contains portions of black text and white background. The block has two distinct colors; therefore, its color pattern is encoded. The block may be encoded by assigning a value of '0' to white pixels and a value of '1' to black pixels. Thus a one-bit word may be used to encode each pixel of the block. Resulting from the encoding is a string of 0's and a string of 1's. Because a large portion of the processing burden is spent finding discrete colors, this simple approach greatly reduces the computational burden.

The strings of zeros and ones are compressed (122). Run length encoding or any suitable algorithm may be used to reduce the length of the strings of 0's and 1's.

A threshold number other than three may be used. The choice of a threshold will depend in part upon the resolution of the image. If the resolution is high, a color will change slowly, and each block might contain only two or three colors. Consider another example in which the threshold number is four and a block contains three distinct colors. The three colors are assigned values of one, two and three, whereby a two-bit word is used to encode each color. However, by limiting the threshold to two, each 24-bit or 32-bit word can be reduced to a single bit. Furthermore, the number of comparisons is lower and the complexity of the classification is lower.

If a block has more than the threshold number of distinct colors (118), edge detection is performed to classify the block (124). If an edge is detected, the block is placed in a class that will be encoded by a lossy high quality compression algorithm (128). If an edge is not detected, the block is likely to contain photographic or natural features and, therefore, is placed in a class that will be encoded by a lossy low quality compression algorithm (130).

The edge detection need not identify the location or orientation of an edge in a block; it merely needs to indicate the presence of an edge in a block. A preferred edge detection technique involves applying an entropy function to a block in order to detect the presence of an edge in the block. The preferred edge detection technique is disclosed in U.S. Ser. No. 09/912,278 filed Jul. 24, 2001, which is incorporated herein by reference.

The lossy compression (128, 130) typically encodes each of the color components of the block into three separate streams.

Additional processing may be performed. For example, a predominant color in the buffered strip may be identified (132) before the blocks are processed. The predominant color of the buffered strip may be identified by performing a statistical analysis on a random sampling of pixels in the buffered strip. The predominant color may be added to header information and used by a decoder as the default color for decoding all of the blocks in the strip. In the alternative, a predominant color of one of the strips could be considered the predominant color of the entire image. Knowledge of the predominant color can lead to more efficient compression of the digital image.

Header information may be added to each block. For example, a first entry of a block header could indicate the threshold number of colors; a second entry could indicate whether the threshold was exceeded, and a third entry could indicate whether the block contains an edge.

Additional block header information could indicate the compression algorithm used to compress the block, and the spatial location of the block in the image. However, this entry for spatial location could be eliminated if the blocks are coded sequentially. The header entry for compression type could be eliminated if the type of compression is agreed upon by convention.

Header information may be added to each strip of blocks. Such header information may identify predominant colors.

The compressed blocks can be decoded with little to no overhead. The blocks are reconstructed with the same algorithms with which they were compressed. The header information in each block allows the compression algorithm to be identified and the reconstructed blocks to be rearranged in their original spatial location in the document. For example, if the second header entry (whether the threshold number of colors is exceeded) is true and the third header entry (whether the block contains an edge) is also true, an agreed-upon lossy compression algorithm could be used to reconstruct a block. If the second entry is true and the third entry is false, a different agreed-upon lossy compression algorithm could be used to reconstruct a block. If the second entry is false, the block is decoded, and word length is derived from the first entry (for example, a threshold of three indicates that each color is encoded by a 1-bit word). Color information (e.g., '0'=black; '1'=white) may be derived from the block and strip headers.

There are different ways of determining the number of distinct colors in a block. Three examples follow.

Figure 2:
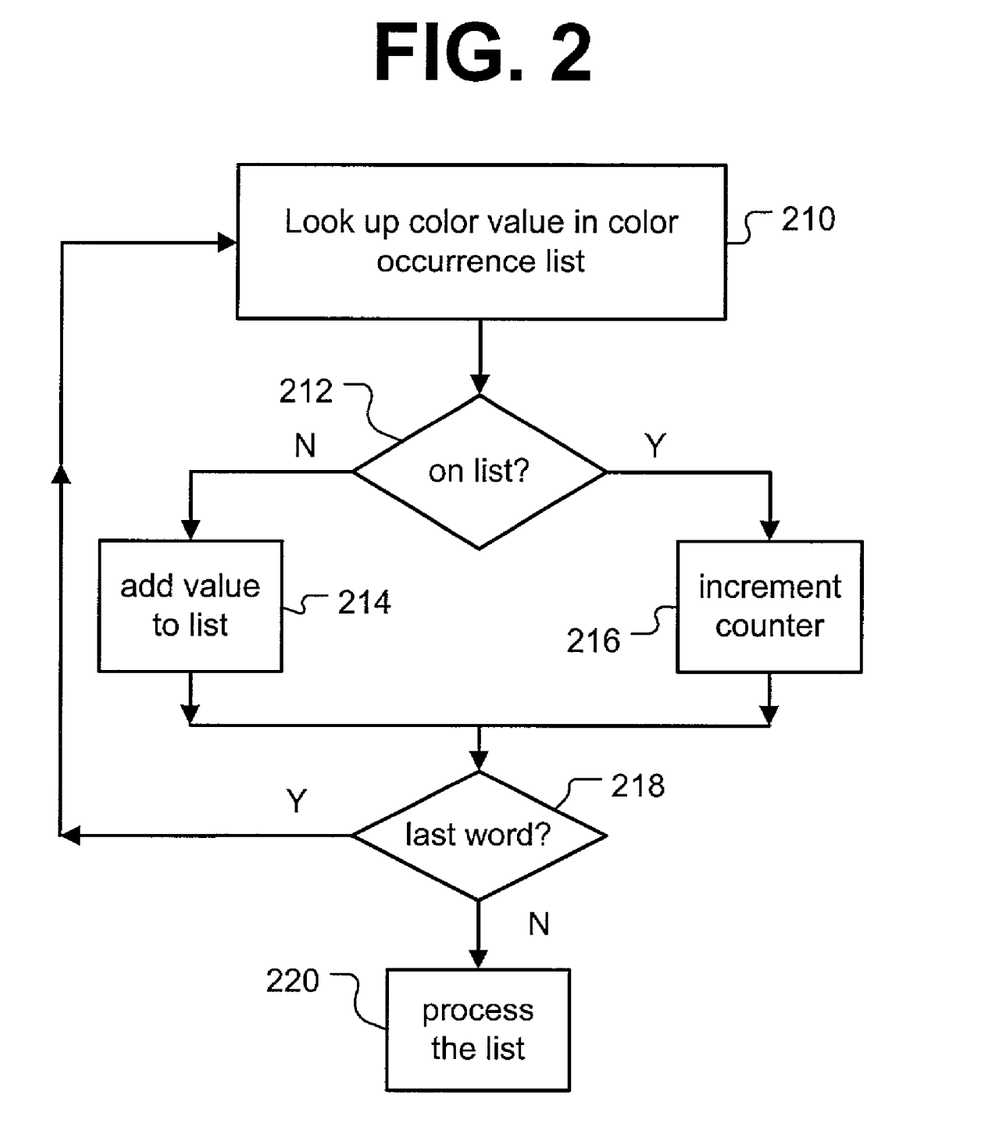
FIG. 2 is a method of identifying distinct colors in an image block.

The first example is shown in FIG. 2. The value of each n-bit word of the block is looked up in a color occurrence list (210). The list includes one or more entries [(R,G,B), q], where (R,G,B) is a color vector and q is the number of times that color vector is selected. If a color vector is not on the color occurrence list (212), that color vector is added to the list (214). If the color vector is already on the list (212), the count (q) of the color vector is incremented (216). After all n-bit words of the block have been identified (218), the list is processed (220). If the number of distinct colors is less than the threshold number, the number of colors on the list is encoded, and the distinct colors on the list are encoded. If not (for example, the block contains a color gradient), the list is discarded.

The second example is similar to the first example, except that the n-bit words are rounded off. An n-bit word may be rounded off, for example, by ignoring its least significant bits. This second example is useful for images having a lot of noise. It also reduces the size of the color occurrence list.

As a third example, the number of distinct colors is determined by dividing the color space into different "color bins," identifying colors in the block and assigning each identified color to a color bin. A color occurrence list is maintained to indicate the number of occurrences or hits for each bin. The number of distinct colors corresponds to the number of color bins that have been "filled" (a color bin may be considered filled if at least one of the identified colors falls within the range of that color bin). Thus, if a color space is divided into eight color bins, a first bin might cover pixel values from 0–31, a second bin might cover pixel values from 32–63, and so on. After all n-bit words of the block have been assigned to color bins, the color occurrence list is processed. Comparing the identified colors to color bins reduces the number of comparisons that are needed to determine the number of distinct colors, as well as reducing the size of the color occurrence list.

Figure 3:
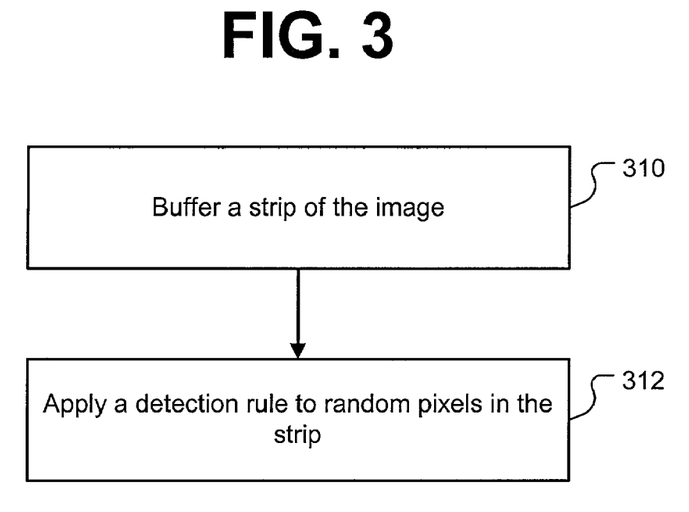
FIG. 3 is an illustration of a general method for identifying a predominant color of the digital image.

Reference is now made to FIG. 3, which shows a method of identifying one or more predominant colors in each strip of the digital image. A strip of the image is buffered (310), and a detection algorithm is applied to a random sampling of pixels in the strip (312). The detection algorithm indicates one or more predominant colors in the strip.

The detection algorithm is based on three parameters: a true color ratio ($r_c$), an acceptable ratio ($r_a$) and a desirable ratio ($r_d$). The true color ratio ($r_c$) is the number of pixels having a specific color divided by the total number of pixels in the strip. The probability of detecting a predominant color is low if $r_c < r_a$, and the probability of detecting a predominant color is high if $r_c > r_d$. The difference between the acceptable ratio ($r_a$) and the desirable ratio ($r_d$) allows for a smooth transition in the detection probability.

The detection algorithm minimizes the probability of identifying a color having $r_c < r_a$ as a predominant color (a "false-positive" outcome"), and it minimizes the probability of not identifying a color having $r_c > r_d$ as a predominant color (a "false-negative" outcome").

Figure 5:
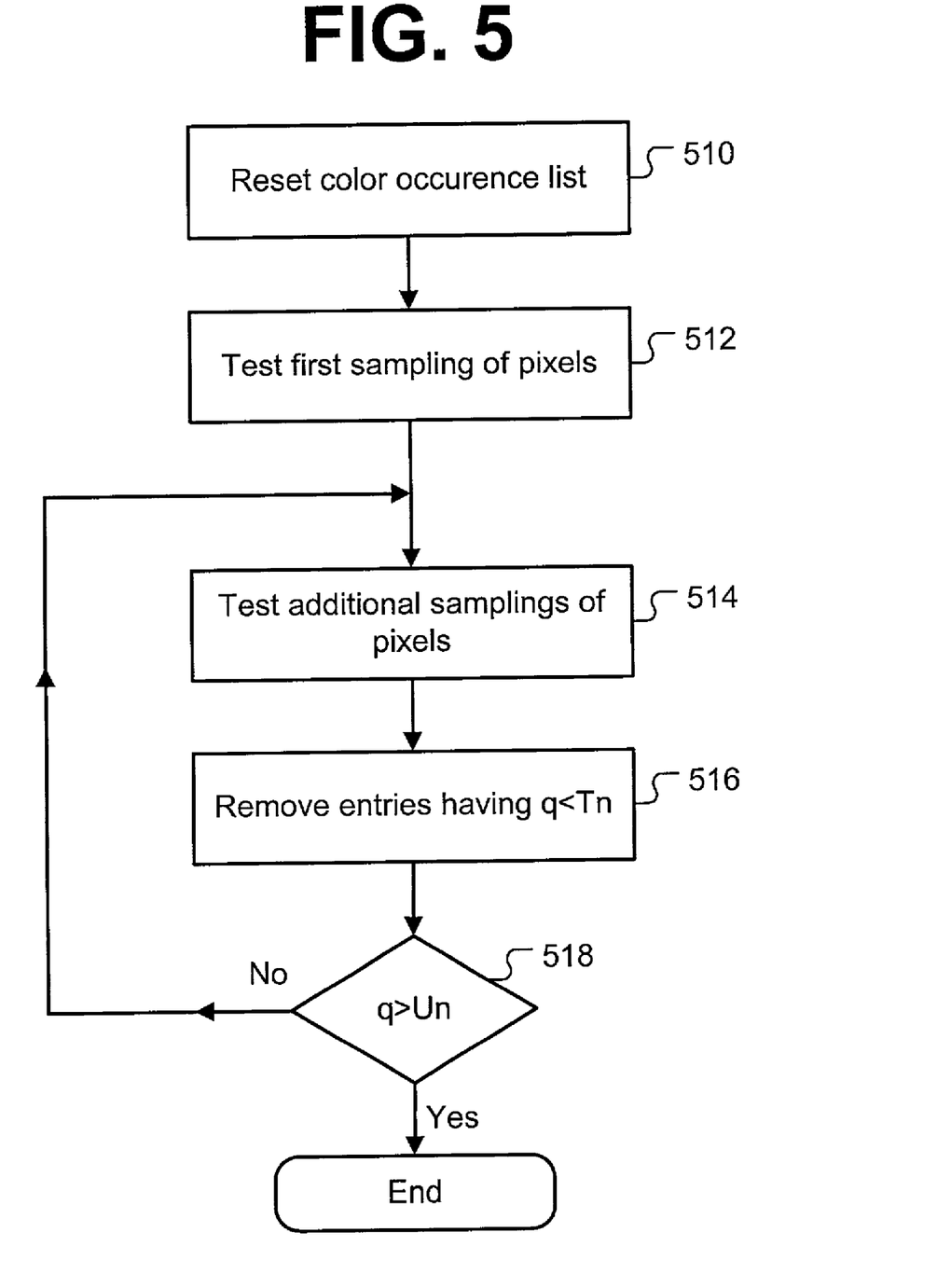
FIG. 5 is an illustration of an exemplary method of identifying predominant colors in a digital image.

Referring to FIG. 5, the following exemplary detection algorithm may be used to create a color occurrence list.

1. The color occurrence list is reset (510). The list may be set as an empty list.
2. A first sampling $P_1$ of pixels is tested (512). If the color vector (R,G,B) of a pixel under test is in the color occurrence list, then the corresponding counter (q) is incremented by one. If the color vector of the pixel under test is not in the color occurrence list, the color vector is added to the list as a new entry of the list, and its counter q is set to one.
3. Additional samplings $P_n$ of pixels are tested, where n=2, 3, 4, . . . , N (514). The following steps are performed for each sampling:
    (a) If the color vector of a pixel under test is in the color occurrence list, then its corresponding counter is incremented by one. If the color vector of the pixel under test is not in the color occurrence list, the color vector is not added to the list. Instead, it is discarded.

(b) At the end of the $n^{th}$ sampling, all entries with counter $q<T_n$ are removed from the list (516).

(c) If the color occurrence list is empty or all entries have a counter $q>U_n$ (518), then the entries in the list are identified as the predominant colors. If $q \leq U_n$, control is returned to step (a) and another sampling is performed.

The number of pixel tests $P_n$ and the corresponding thresholds $T_n$ and $U_n$ are chosen so that no predominant color is removed from the list.

An optimal set of parameters $P_n$, $T_n$ and $U_n$ may be computed as follows. Probability functions $f(l,k,p)$ and $v(l,k,p)$ are defined as $$f(l, k, p) = \binom{k}{l} p^l (1-p)^{k-l} = \frac{k! p^l (1-p)^{k-l}}{l!(k-l)!}$$

$$v(l, k, p) = \sum_{i=0}^{l} f(i, k, p)$$

The probability that a color with $r_c \leq r_d$ is discarded at the $n^{th}$ step (step 3(b)) is determined not only by the number of occurrences, but also considering if it was not discarded in a previous step. The probability that a color vector is not discarded is $$B_d^n(r_c) = \sum_{T_{n-1}}^{T_n-1} \sum_{l=T_{n-1}}^{k} B_{n-1}(l, r_c) f(k-l, P_n, r_c)$$

After using this equation to compute $P_n$ and $T_n$, the probabilities can be updated using the following:

$$B_n(k, r_c) = \begin{cases} \sum_{l=T_{n-1}}^{k} B_{n-1}(l, r_c) f(k-l, P_n, r_c), & T_n \leq k \leq S_n \\ 0, & 0 \leq k < T_n \end{cases}$$

The probabilities of false-positive and false-negative decisions at step n are $$F_{FN}^n \leq B_d^n(r_d) \text{ and }$$

$$F_{FP}^n \leq \sum_{k=U_n}^{S_n} B_n(k, r_a).$$

The probabilities of false-positive and false-negative decisions are bounded by $$F_{FP} \leq 1 - B_d^N(r_a) \text{ and } F_{FN} \leq B_d^N(r_d).$$

Thus the parameters may be determined by starting with initial values and adjusting the values until the desired probabilities occur.

When the acceptable ratio ($r_a$) is relatively large (e.g., 0.3) only a very small number of entries will be in the color occurrence list. For smaller acceptable ratios ($r_a$), however, the color occurrence list may be implemented efficiently as a sorted list, so that pixels are compared first to the most common colors; or as a hash table in order to minimize the number of color comparisons.

Figure 4:
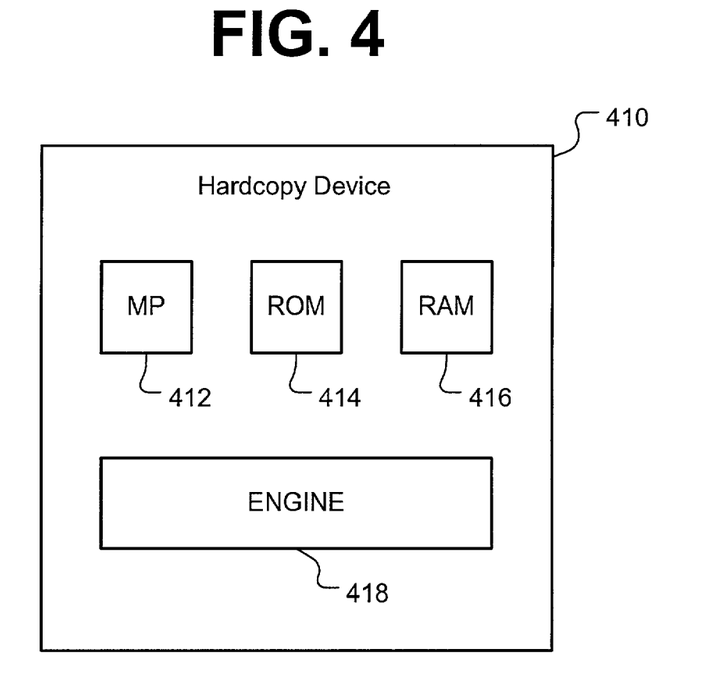
FIG. 4 is an illustration of a hardcopy device that implements the method of FIG. 1.

Reference is now made to FIG. 4, which shows a hardcopy device 410 that utilizes the method described above. The hardcopy device 410 includes a processor 412, read-only memory 414 and random access memory 416. The read-only memory 414 stores a program that, when executed, causes the processor 412 to process the digital image according to the method of FIG. 1. The random access memory 416 is used for buffering the strips and storing intermediate results of the processing (such as results from each compression block). The hardcopy device also includes an engine 418. In a digital copier, for example, the engine 418 would include a print engine and a scan engine.

The method is not limited to any particular hardcopy device. Exemplary hardcopy devices include digital copiers, printers, scanners, and all-in-one machines. The method is not limited to hardcopy devices; it may be implemented in any device that stores a digital image.

The present invention is not limited to the specific embodiments described and illustrated above. Instead, the present invention is construed according to the claims that follow.

The invention claimed is:

1. A method comprising identifying at least one predominant color in a digital image, including applying a detection rule to randomly-selected pixels in the image, the rule including testing specific colors among the randomly selected pixels to reduce the probability of at least one of a false-positive outcome and a false-negative outcome; and storing results of the detection rule in memory.

2. The method of claim 1, wherein the detection rule is applied to a strip of randomly-selected pixels in the image.

3. The method of claim 1, wherein the detection rule minimizes the probability of a false-positive outcome and a false-negative outcome.

4. The method of claim 1, wherein the probability of a false-positive outcome is the probability of identifying a color having $r_c < r_a$ as a predominant color, where $r_c$ is the number of pixels in a sample region having a specific color divided by the total number of pixels in the sample region, and $r_a$ is an acceptable ratio.

5. The method of claim 1, wherein the probability of a false-negative outcome is the probability of identifying a color having $r_c > r_d$ as a predominant color, where rc is the number of pixels in a sample region having a specific color divided by the total number of pixels in the sample region, and $r_d$ is a desirable ratio.

6. The method of claim 1, wherein the detection rule is used to create a color occurrence list.

7. The method of claim 6, wherein the color list is created by testing a first sampling of pixels in the image, for each pixel in the sampling:
   if a color vector of the pixel is in the list, incrementing a corresponding counter; and
   if the color vector is not in the list, adding the color vector to the list and initializing a corresponding counter.

8. The method of claim 7, further comprising testing at least one additional sampling of pixels in the image, for each pixel of each sampling:
   incrementing the corresponding counter if a color vector of the pixel is in the list.

9. The method of claim 8, wherein at the end of each additional sampling, all entries with counter $q<T_n$ are removed from the list.

10. The method of claim 8, wherein no additional samplings are tested and the list is finalized if the list is empty or all entries have a counter $q>U_n$, whereby all color vectors in the list are identified as the predominant colors.

11. The method of claim 6, wherein the color occurrence list is maintained as a sorted list.

12. The method of claim 6, wherein the color occurrence list is maintained as a hash table.

13. Apparatus for identifying at least one predominant color in a digital image, the apparatus comprising a processor and memory encoded with code that, when executed, causes the processor to apply a detection rule to randomly-selected pixels in the image; wherein the detection rule includes testing specific colors to reduce the probability of at least one of a false-positive outcome and a false-negative outcome.

14. The apparatus of claim 13, wherein the processor determines at least one predominant color for each strip of the image.

15. The apparatus of claim 13, wherein the detection rule minimizes the probability of a false-positive outcome and a false-negative outcome.

16. The apparatus of claim 13, wherein the probability of a false-positive outcome is the probability of identifying a color having $r_c<r_a$ as a predominant color, where $r_c$ is the number of pixels in a sample region having a specific color divided by the total number of pixels in the sample region, and $r_a$ is an acceptable ratio.

17. The apparatus of claim 13, wherein the probability of a false-negative outcome is the probability of identifying a color having $r_c>r_d$ as a predominant color, where $r_c$ is the number of pixels in a sample region having a specific color divided by the total number of pixels in the sample region, and $r_d$ is a desirable ratio.

18. The apparatus of claim 13, wherein the detection rule is used to create a color occurrence list.

19. The apparatus of claim 18, wherein the color list is created by testing a first sampling of pixels in the image, for each pixel in the sampling:

if a color vector of the pixel is in the list, incrementing a corresponding counter; and if the color vector is not in the list, adding the color vector to the list and initializing a corresponding counter.

20. The apparatus of claim 19, further comprising testing at least one additional sampling of pixels in the image, for each pixel of each sampling:

incrementing the corresponding counter if a color vector of the pixel is in the list.

21. The apparatus of claim 20, wherein at the end of each additional sampling, all entries with counter $q<T_n$ are removed from the list.

22. The apparatus of claim 20, wherein no additional samplings are tested and the list is finalized if the list is empty or all entries have a counter $q>U_n$, whereby all color vectors in the list are identified as the predominant colors.

23. An article for a processor, the article comprising memory encoded with code for instructing the processor to identify at least one predominant color in a digital image; wherein the code causes the processor to apply a detection rule to randomly-selected pixels in the image to reduce the probability of at least one of a false-positive outcome and a false-negative outcome.

\* \* \* \* \*

UNITED STATES PATENT AND TRADEMARK OFFICE
CERTIFICATE OF CORRECTION

PATENT NO. : 7,191,103 B2
APPLICATION NO. : 09/924926
DATED : March 13, 2007
INVENTOR(S) : Amir Said

It is certified that error appears in the above-identified patent and that said Letters Patent is hereby corrected as shown below:

In column 5, line 24, delete "$r_c \leq r_d$" and insert -- $r_c \geq r_d$ --, therefor.

In column 6, line 47, in Claim 5, after "where" delete "rc" and insert -- $r_c$ --, therefor.

Signed and Sealed this

Seventh Day of April, 2009

JOHN DOLL
*Acting Director of the United States Patent and Trademark Office*